United States Patent [19]
Castellani et al.

[11] Patent Number: 6,162,548
[45] Date of Patent: *Dec. 19, 2000

[54] CABLES WITH A HALOGEN-FREE RECYCLABLE COATING COMPRISING POLYPROPYLENE AND AN ETHYLENE COPOLYMER HAVING HIGH ELASTIC RECOVERY

[75] Inventors: Luca Castellani, Corsico; Eduardo Redondo Grizante, Monza; Antonio Zaopo, Milan; Enrico Albizzati, Arona, all of Italy

[73] Assignee: Pirelli Cavi e Sistemi S.p.A., Milan, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 09/121,557

[22] Filed: Jul. 23, 1998

[30] Foreign Application Priority Data

Jul. 23, 1997 [IT] Italy ................................. MI97A1741

[51] Int. Cl.$^7$ ............................ B32B 27/00; C08L 23/04
[52] U.S. Cl. ............................................. 428/500; 428/590
[58] Field of Search ....................................... 428/590, 500

[56] References Cited

U.S. PATENT DOCUMENTS

| Re. 31,518 | 2/1984 | Fischer . | |
|---|---|---|---|
| 4,098,762 | 7/1978 | Miyata et al. . | |
| 4,130,535 | 12/1978 | Coran et al. . | |
| 4,145,404 | 3/1979 | Miyata et al. . | |
| 4,317,765 | 3/1982 | Gaylord . | |
| 4,348,459 | 9/1982 | Drzal et al. . | |
| 4,948,669 | 8/1990 | Rolland . | |
| 4,948,840 | 8/1990 | Berta . | |
| 4,985,502 | 1/1991 | Izumi et al. . | |
| 5,008,204 | 4/1991 | Stehling . | |
| 5,229,478 | 7/1993 | Floyd et al. | 526/160 |
| 5,272,236 | 12/1993 | Lai et al. | 526/348.5 |
| 5,414,040 | 5/1995 | McKay et al. | 524/576 |
| 5,525,757 | 6/1996 | O'Brien . | |

FOREIGN PATENT DOCUMENTS

| 0 328 051 A1 | 8/1989 | European Pat. Off. . |
|---|---|---|
| 0 530 940 A1 | 3/1993 | European Pat. Off. . |
| 0 542 253 B1 | 5/1993 | European Pat. Off. . |
| 0 618 259 A2 | 10/1994 | European Pat. Off. . |
| 0 632 065 A1 | 1/1995 | European Pat. Off. . |
| 0 780 425 A1 | 6/1997 | European Pat. Off. . |
| 0 416 815 B1 | 8/1997 | European Pat. Off. . |
| 0 418 044 B1 | 9/1997 | European Pat. Off. . |
| 63-225641 | 9/1988 | Japan . |
| 1-294792 | 11/1989 | Japan . |
| 3-231944 | 10/1991 | Japan . |
| 5-17692 | 1/1993 | Japan . |
| 7-161230 | 6/1995 | Japan . |
| WO 93/19107 | 9/1993 | WIPO . |
| WO 94/06859 | 3/1994 | WIPO . |
| WO 96/23311 | 8/1996 | WIPO . |
| WO 96/27885 | 9/1996 | WIPO . |

OTHER PUBLICATIONS

L. Wild et al., "Determination of Branching Distributions in Polyethylene and Ethlene Copolymers," Journal of Polymer Science: Polymer Physics Edition, vol. 20, pp. 441–455 (1982).

P.C. Mohring & N.J. Corville, "Homogeneous Group 4 metallocene Ziegler–Natta catalysts: the influence of cyclo-pentadienyl–ring substituents, " Journal of Organometallic Chemistry, vol. 479, pp. 1–29 (1994).

V.K. Gupta et al., "Metallocene Complexes of Group 4 Elements in the Polymerization of Monoolefins, " Journal of Macromolecular Science: Reviews in Macromolecular Chemistry and Physics, vol. C34, No. 3, pp. 439–514 (1994).

AN 98–205243, "Low–Smoke, Self–Extinguishing Electric Cable Coating Composition —Comprises a Crystalline Propylene Polymer, a Copolymer of Ethylene With an Alpha–Olefin and Optionally a Diene, and Natural Magnesium Hydroxide, " Derwent Publications, Ltd., London, GB, XP–002084928 (1998).

*Primary Examiner*—Kriellion Sanders
*Attorney, Agent, or Firm*—Finnegan, Henderson, Farabow, Garrett & Dunner, L.L.P.

[57] ABSTRACT

A cable, in particular for power transmission, for telecommunications or for data transmission, or also combined power/telecommunications cables, wherein at least one coating layer consists of a recyclable material which is halogen-free and has superior mechanical and electrical properties. This material consists of a polymer mixture comprising: (a) a crystalline propylene homopolymer or copolymer; and (b) an elastomeric copolymer of ethylene with at least one alpha-olefin having from 3 to 12 carbon atoms, and optionally with a diene; the said copolymer (b) being characterized by a 200% tension set value (measured at 20° C. for 1 minute according to ASTM standard D 412) lower than 30%.

28 Claims, 1 Drawing Sheet

CABLES WITH A HALOGEN-FREE RECYCLABLE COATING COMPRISING POLYPROPYLENE AND AN ETHYLENE COPOLYMER HAVING HIGH ELASTIC RECOVERY

BACKGROUND OF THE INVENTION

The present invention relates to cables, in particular for power transmission, for telecommunications or for data transmission, or also combined power/telecommunications cables, wherein at least one coating layer consists of a recyclable material which is halogen-free and has superior mechanical and electrical properties.

There is currently a great need for highly environmentally friendly products, consisting of materials which are not harmful to the environment either during their production or when in use, and which are readily recyclable at the end of their working life. However, the option of using ecological materials is, in all cases, subject to the need to keep costs within acceptable limits, while still guaranteeing performance levels which are at least equivalent to those of conventional materials and which are, in any case, satisfactory under the most common conditions of use.

In the cables sector, in particular power transmission cables, the various coatings surrounding the conductor commonly consist of a crosslinked polymer material, in particular polyethylene or ethylene copolymers suitably crosslinked during extrusion, so as to give satisfactory mechanical performances even under heating in continuous use and under conditions of current overload, while at the same time maintaining a high level of flexibility. These materials are crosslinked and therefore cannot be recycled since they are devoid of thermoplastic properties, hence they can only be disposed of at the end of their working life by means of incineration. Moreover, in certain cases the outer protective sheath consists of polyvinyl chloride (PVC) which is difficult to separate by conventional methods (for example in water by density difference) from the crosslinked polyolefins containing inorganic fillers (for example from ethylene/propylene rubbers containing inorganic fillers), and, on the other hand, PVC cannot be incinerated together with crosslinked polyolefins since this produces highly toxic chlorinated products by combustion.

Patent application WO 96/23311 describes a low-voltage high-current cable wherein the insulating coating, the inner sheath and the outer sheath are made of the same non-crosslinked polymer-based material which is black coloured by addition of carbon black. Using the same base material would allow recycling without the need to separate different materials. Polyethylene is suggested as the polymer material for uses at temperatures below 70° C., while thermoplastic elastomers consisting of two-phase mixtures of polypropylene with an ethylene/propylene co- or terpolymer (EPR or EPDM rubber) are proposed in cases involving a maximum working temperature of 90° C. Within the latter class of polymers, mention is specifically made of the commercial products Santoprene® from Monsanto (polypropylene-based thermoplastic elastomer) and of heterophase propylene copolymers obtained in reactor, with an ethylene/propylene elastomeric phase content of greater than 25% by weight, for example 43% by weight of ethylene/propylene rubber (product Novolen® 2912 HX from BASF). At any event, propylene/EPR or EPDM mixtures are concerned, obtained using conventional vanadium- and/or titanium-based Ziegler-Natta catalysts.

SUMMARY OF THE INVENTION

The Applicant has perceived that the technical problem of obtaining a cable with a coating made of a non-crosslinked, and thus recyclable, polymer material which also has mechanical and electrical properties suitable to the us conditions of use is dependent on the use of a crystalline propylene homopolymer or copolymer mixed with an elastomeric ethylene copolymer having a high capacity for elastic recovery without the need for crosslinking, as indicated by low values of tension set, that is of permanent deformation after a tensile force has been applied to a specimen of non-crosslinked material. Moreover, the Applicant has perceived that this high capacity of elastic recovery in non-crosslinked materials can be obtained with copolymers of ethylene with an alpha-olefin, and optionally with a diene, these copolymers having a highly regular structure, such as those obtainable by copolymerization of the corresponding monomers in the presence of a single-site catalyst, for example a metallocene catalyst.

In particular, the Applicant has found that excellent performances, both in terms of mechanical properties, in particular elongation at break, stress at break and modulus, and in terms of electrical properties, in particular as regards water absorption, can be obtained by using, as non-crosslinked base material for at least one of the coating layers of the cable, a mixture as defined hereinbelow, comprising a crystalline propylene homopolymer or copolymer and an elastomeric copolymer of ethylene with at least one alpha-olefin, and optionally with a diene comonomer, the latter copolymer having a 200% tension set value lower than 30%, preferably lower than 25%.

Therefore, according to a first aspect the invention relates to a cable comprising a conductor and one or more coating layers, wherein at least one of the said coating layers comprises as non-crosslinked base polymer material a mixture comprising: (a) a crystalline propylene homopolymer or copolymer; and (b) an elastomeric copolymer of ethylene with at least one alpha-olefin having from 3 to 12 carbon atoms, and optionally with a diene; the said copolymer (b) being characterized by a 200% tension set value (measured at 20° C. for 1 minute according to ASTM standard D 412) lower than 30%, preferably lower than 25%.

According to a further aspect, the invention relates to a cable comprising a conductor and one or more coating layers, wherein at least one of the said coating layers has electrical insulating properties and comprises a mixture as defined above as non-crosslinked base polymer material.

According to a further aspect, the invention relates to a cable comprising a conductor and one or more coating layers, wherein at least one of the said coating layers has semiconductive properties and comprises a mixture as defined above as non-crosslinked base polymer material.

According to a further aspect, the invention relates to a cable comprising a conductor and one or more coating layers, wherein at least one of the said coating layers is an outer protective sheath and comprises a mixture as defined above as non-crosslinked base polymer material.

According to a further aspect, the invention relates to a cable comprising a conductor and one or more coating layers, wherein at least 70%, preferably at least 90%, by weight relative to the total weight of the base polymer material of the said coating layers consists of a mixture as defined above.

The tension set provides a measure of the capacity for elastic recovery in the non-crosslinked material. This is determined by subjecting a specimen of the test material to a tensile force such as to obtain an elongation of 200% for a predetermined period. After removing the stress, the permanent deformation of the specimen, which is expressed as a percentage relative to the initial dimensions, is measured: the smaller this value, the better the elastic properties of the material.

The elastomeric copolymers (b) are characterized by a high regioregularity in the monomer unit chains. In particular, when the alpha-olefin is propylene, these elastomeric copolymers have an amount of —CH$_2$— groups in —(CH$_2$)$_n$— sequences, where n is an even integer, relative to the total amount of —CH$_2$— groups, which is generally less than 5 mol %, preferably less than 1 mol %. This amount can be determined by known techniques using $^{13}$C-NMR analysis.

The elastomeric copolymers (b) are generally characterized by a melting enthalpy of less than 35 J/g, preferably less than 30 J/g, while solubility in pentane at 20° C. is generally greater than 80% by weight. The intrinsic viscosity of copolymers (b) is generally greater than 1.0 dl/g, preferably greater than 2.0 dl/g (determined in tetralin at 135° C.), while Mooney viscosity ML(1+4) at 125° C. (measured according to standard ASTM D1646) is generally greater than 10, preferably of from 20 to 90. The molecular weight distribution of the elastomeric copolymers (b) is generally narrow, with a molecular weight distribution index, defined as the ratio between the weight-average molecular weight ($M_w$) and the number-average molecular weight ($M_n$) (MWD=$M_w/M_n$), generally less than 5, preferably less than 3 (determined by gel permeation chromatography (GPC)).

Ethylene/alpha-olefin or ethylene/alpha-olefin/diene copolymers with such characteristics can be obtained by copolymerization of ethylene with an alpha-olefin, and optionally with a diene, in the presence of a single-site catalyst, for example a metallocene catalyst, as described, e.g., in patent applications WO 93/19107 and EP-A-632065. The metallocenes used to polymerize the olefins are coordination complexes of a transition metal, usually from group IV, in particular titanium, zirconium or hafnium, with two optionally substituted cyclopentadienyl ligands, used in combination with a co-catalyst, for example an alumoxane, preferably methylalumoxane, or a boron compound (see for example J.M.S.-Rev. Macromol. Chem. Phys., C34(3), 439–514 (1994); J. Organometallic Chemistry, 479 (1994), 1–29, or U.S. Pat. Nos. 5,272,236, 5,414,040 and 5,229,478, or the above-mentioned patent applications WO 93/19107 and EP-A-632065). Catalysts which are suitable for obtaining the copolymers (b) according to the present invention are also the so-called Constrained Geometry Catalysts described, for example, in patents EP-416,815 and EP-418,044.

With alpha-olefin it is meant an olefin of formula CH$_2$=CH—R, where R is a linear or branched alkyl having from 1 to 10 carbon atoms. The alpha-olefin may be selected, for example, from propylene, 1-butene, 1-pentene, 4-methyl-1-pentene, 1-hexene, 1-octene, 1-dodecene and the like. Propylene is particularly preferred.

When a diene comonomer is present, this generally has from 4 to 20 carbon atoms and is preferably selected from: linear, conjugated or non-conjugated diolefins, for example 1,3-butadiene, 1,4-hexadiene or 1,6-octadiene; monocyclic or polycyclic dienes, for example 1,4-cyclohexadiene, 5-ethylidene-2-norbornene, 5-methylene-2-norbornene and the like.

The elastomeric copolymers (b) which may be used according to the present invention generally have the following composition: 35–90 mol % of ethylene; 10–65 mol % of alpha-olefin, preferably propylene; 0–10 mol % of a diene, preferably 1,4-hexadiene or 5-ethylidene-2-norbornene. When the alpha-olefin is propylene, the copolymer (b) preferably has the following composition: 55–80% by weight, preferably 65–75% by weight, of ethylene; 20–45% by weight, preferably 25–35% by weight, of propylene; 0–10% by weight, preferably 0–5% by weight, of a diene (preferably 5-ethylene-2-norbornene).

When the alpha-olefin is propylene, the propylene units are in the form of triads, generally in amounts of between 4 and 50 mol % relative to the total amount of propylene, with at least 70% of these triads being of isotactic structure, as shown by $^{13}$C-NMR analysis.

The crystalline propylene homopolymer or copolymer (a) generally has a melting enthalpy of greater than 75 J/g, preferably greater than 85 J/g. It may be selected in particular from:

(1) isotactic propylene homopolymers with an isotactic index of greater than 80, preferably greater than 90, even more preferably greater than 95;

(2) propylene homopolymers which can be obtained using metallocene catalysts, having a pentad mmmm content of greater than 90% (determined by $^{13}$C-NMR analysis);

(3) crystalline copolymers of propylene with ethylene and/or an alpha-olefin having from 4 to 10 carbon atoms, with an overall content of ethylene and/or alpha-olefin of less than 10 mol %;

(4) heterogeneous propylene copolymers which can be obtained by block polymerization of propylene and of mixtures of propylene with ethylene and/or an alpha-olefin having from 4 to 10 carbon atoms, containing at least 70% by weight of polypropylene homopolymer or of crystalline propylene/ethylene copolymer, with an isotactic index of greater than 80, the remainder consisting of an elastomeric ethylene/propylene copolymer with a propylene content of between 30 and 70% by weight;

(5) crystalline propylene homopolymers of copolymers having syndiotactic structure, obtainable using metallocene catalysts.

According to the present invention, the elastomeric ethylene/alpha-olefin or ethylene/alpha-olefin/diene copolymer (b) as described above is present in admixture with the crystalline propylene homopolymer or copolymer (a) in a predetermined amount, such as to confer sufficient flexibility to the resulting polymer mixture, and in particular to obtain a value of elongation at break, measured according to CEI standard 20–34, § 5.1, of at least 100%, preferably of at least 200%, and a 20% modulus value, measured according to CEI standard 20–34, § 5.1, of less than 10 MPa, preferably less than 7 MPa.

Generally, these characteristics may be obtained using mixtures comprising from 10 to 60%, preferably from 20 to 50%, by weight of crystalline propylene homopolymer or copolymer (a) and from 40 to 90%, preferably from 50 to 80%, by weight of elastomeric copolymer (b), the percentages being relative to the total weight of the polymeric components (a) and (b).

In accordance with the present invention, the use of non-crosslinked polymer mixtures as defined above makes it possible to obtain a recyclable, flexible coating which has excellent mechanical properties, both in terms of modulus and in terms of elongation and stress at break. In particular, it is possible to obtain mechanical performances under heating, that is at 90° C. for continuous use and at 130° C. in the case of current overload, which are comparable with the typical performances of the crosslinked polyethylene based coatings currently on sale, making the abovementioned mixtures suitable not only for low voltages but also for medium- and high-voltage cables.

The mechanical properties mentioned above are accompanied by excellent electrical properties, such as insulation constant (Ki) and dielectric loss (tan delta), both under dry conditions and, especially, when the cable is submerged in water. In particular, it has been found that the non-crosslinked material according to the present invention has a very low water absorption index, lower than that which can be obtained using the polypropylene/EPR or EPDM rubber mixtures obtained by means of traditional vanadium or titanium Ziegler-Natta catalysts.

The fact that an insulating material has low water absorption makes it possible to reduce dielectric loss remarkably and thus to achieve lower energy dissipation levels, in particular during high power transmission. In the case of low-voltage high-current power transmission, low water absorption avoids an excessive reduction of electrical resistivity of the insulating material and thus of its electrical performance.

The polymer mixtures according to the present invention are also capable of containing inorganic fillers without an unacceptable reduction in their mechanical and elastic properties, in particular as to elongation at break, which remains well above 100%. It is thus possible to produce compositions with flame-retardant properties which are endowed with high flexibility and high mechanical strength. The Applicant has also observed that the mixture is more easily processed, as demonstrated by the low torque values measured on filled systems at the end of the mixing process, which are essentially unchanged with respect to mixtures without inorganic fillers.

Thus, according to a further aspect, the present invention relates to a polymer composition with flame-retardant properties, comprising:

(a) a crystalline propylene homopolymer or copolymer;

(b) an elastomeric copolymer of ethylene with at least one alpha-olefin having from 3 to 12 carbon atoms, and optionally with minor amounts of a diene as termonomer, the said copolymer (b) being characterized by a 200% tension set value (measured at 20° C. for 1 minute according to ASTM standard D 412) lower than 30%, preferably lower than 25%;

(c) an inorganic filler in an amount such as to impart flame-retardant properties.

Moreover, a further aspect of the present invention resides in a cable comprising a conductor and one or more coating layers, wherein at least one of the said coating layers comprises a polymer composition with flame-retardant properties as defined above.

The inorganic filler is generally an inorganic oxide, preferably in hydrate or hydroxide form. Examples of suitable compounds are aluminium, bismuth, cobalt, iron, magnesium, titanium or zinc oxides and the corresponding hydroxides, or mixtures thereof. Magnesium hydroxide, aluminium hydroxide or aluminium trihydrate ($Al_2O_3.3H_2O$), or mixtures thereof, are particularly preferred. One or more inorganic oxides or salts such as CoO, $TiO_2$, $Sb_2O_3$, ZnO, $Fe_2O_3$, $CaCO_3$ or mixtures thereof, may advantageously be added to these compounds in minor amounts, generally less than 25% by weight. Preferably, the above-mentioned metal hydroxides, in particular magnesium and aluminium hydroxides, are used in the form of particles having sizes which can range from 0.1 to 100 $\mu$m, preferably from 0.5 to 10 $\mu$m. In the case of hydroxides, these can advantageously be used in the form of coated particles. Saturated or unsaturated fatty acids containing from 8 to 24 carbon atoms, and metal salts thereof, are usually used as coating materials, such as, for example: oleic acid, palmitic acid, stearic acid, isostearic acid, lauric acid; magnesium or zinc stearate or oleate; and the like.

The amount of inorganic filler which is suitable for imparting flame-retardant properties may vary within a wide range, generally between 10 and 80% by weight, preferably between 30 and 70% by weight, relative to the total weight of the composition.

A coupling agent selected from those known in the art, for example silane compounds or carboxylic derivatives having at least one ethylenic unsaturation may be added to the mixture in order to enhance compatibility between the inorganic filler and the polymer matrix.

Examples of silane compounds which are suitable or this purpose are: γ-methacryloxypropyltrimethoxysilane, methyltriethoxysilane, methyltris(2-methoxyethoxy)silane, dimethyldiethoxysilane, vinyltris(2-methoxyethoxy)silane, vinyltrimethoxysilane, vinyltriethoxysilane, octyltriethoxysilane, isobutyltriethoxysilane, isobutyltrimethoxysilane and mixtures thereof.

Carboxylic derivatives with ethylenic unsaturation which may advantageously be used as coupling agents are, for example, unsaturated carboxylic anhydrides or, preferably, unsaturated dicarboxylic anhydrides; maleic anhydride is particularly preferred. Alternatively, as compatibilizing agents polyolefins, optionally containing ethylenic unsaturations, can be used, on which carboxylic groups have been grafted by reaction with the above-mentioned carboxylic derivatives having at least one ethylenic unsaturation.

The coupling agent, either of silane type or of carboxylic type, can be used as such, or grafted onto at least one of the polymer components of the mixture.

The amount of coupling agent to be added to the mixture may vary, mainly depending on the type of coupling agent used and on the amount of inorganic filler added, and is generally between 0.05 and 30%, preferably between 0.1 and 20%, by weight with respect to the total weight of the base polymer mixture.

Other conventional components such as antioxidants, fillers, processing co-adjuvants, lubricants, pigments, water-tree retardant additives and the like, may be added to the base polymer material. In the case of the semiconductive layers 3 and 5, the polymer material is preferably filled with carbon black in an amount such as to give the material semiconductive properties (namely, so as to obtain a resistivity of less than 5 ohm.m at room temperature).

Suitable conventional antioxidants are, for example: polymerized trimethyldihydroquinoline, 4,4'-thiobis(3-methyl-6-tert-butyl)phenol; pentaerythryl tetra[3-(3,5-ditertbutyl-4-hydroxyphenyl)propionate], 2,2'-thiodiethylene-bis-[3-(3,5-ditertbutyl-4-hydroxyphenyl)propionate], and the like, or mixtures thereof.

Other fillers which may be used in the present invention include, for example, glass particles, glass fibres, calcined kaolin, talc and the like, or mixtures thereof. Processing co-adjuvants usually added to the polymer base are, for example, calcium stearate, zinc stearate, stearic acid, paraffin wax, silicone rubbers and the like, or mixtures thereof.

BRIEF DESCRIPTION OF THE FIGURE

Further details will be illustrated in the following detailed description, with reference to the appended drawing, wherein.

DETAILED DESCRIPTION OF THE PREFERRED

Figure 1:
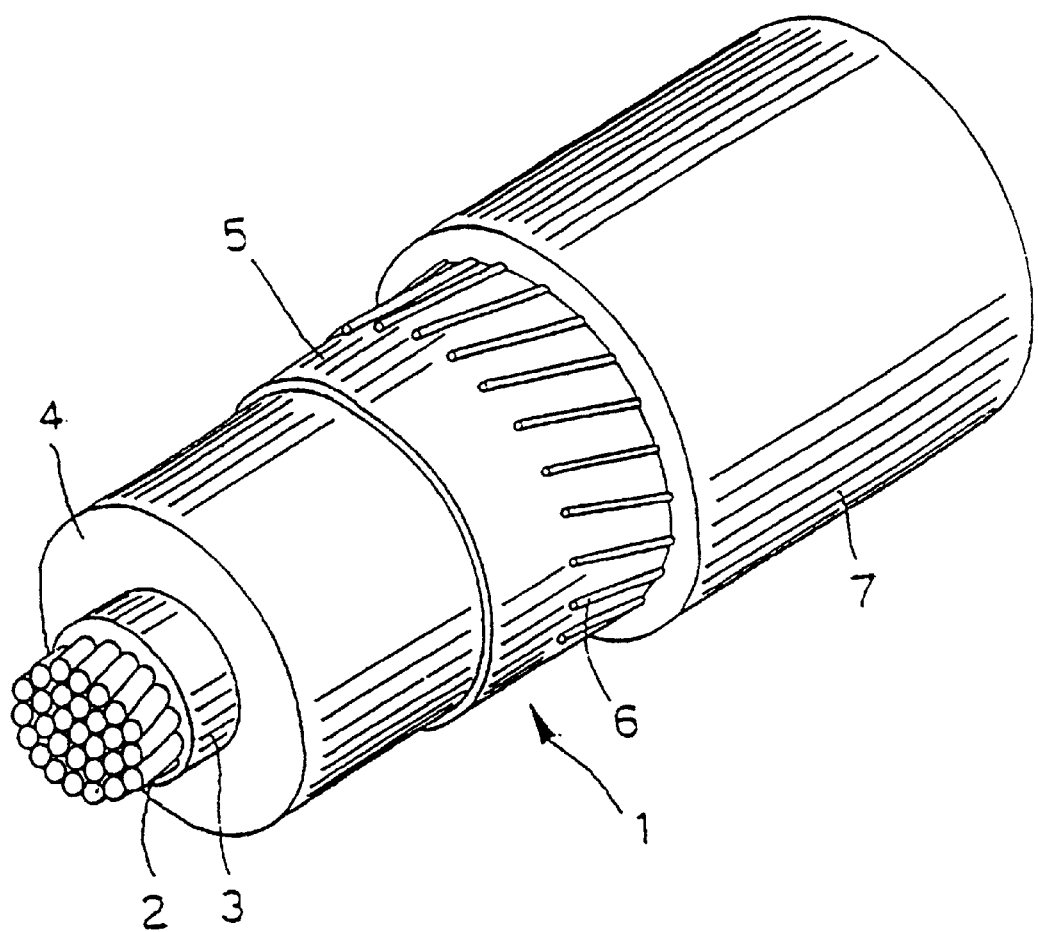
FIG. 1 is a perspective view of an electrical cable, particularly suitable for medium voltages, according to the present invention.

In FIG. 1, the electrical cable 1 comprises a conductor 2; an inner layer 3 with semiconductive properties; an intermediate layer 4 with insulating properties; an outer layer 5 with semiconductive properties; a screen 6; and an outer sheath 7.

The conductor 2 generally consists of metal wires, preferably made of copper or aluminium, which are braided together using conventional techniques.

At least one of the layers 3, 4 and 5, and preferably at least the insulating layer 4, comprises polypropylene as non-crosslinked base polymer material, mixed with a copolymer of ethylene with at least one alpha-olefin, and optionally with a diene, as defined above. In a preferred embodiment of the present invention, all of the insulating and semiconductive layers 3, 4 and 5 comprise a polymer mixture as defined above as non-crosslinked base polymer material.

A screen 6, generally consisting of helically wound electrically conductive wires or strips, is usually placed around the outer semiconductive layer 5.

This screen is then covered with a sheath 7, consisting of a thermoplastic material such as polyvinyl chloride (PVC), non-crosslinked polyethylene (PE) or, preferably, a mixture comprising polypropylene and an elastomeric ethylene/alpha-olefin or ethylene/alpha-olefin/diene copolymer, as defined above.

FIG. 1 shows only one possible embodiment of a cable according to the present invention. It is clear that suitable changes known in the art may be made to this embodiment without thereby departing from the scope of the present invention. In particular, the recyclable polymer mixtures according to the present invention may advantageously also be used for coating telecommunications cables or data transmission cables, or also combined power/telecommunications cables.

Some properties of the polymer materials used according to the present invention (EPDM 1) and of materials used for comparative purposes (EPDM 2 and PP/EPR mix) are given in Table 1. As melting enthalpy the second melting value ($\Delta H_{2m}$) is given, obtained by DSC at a scan speed of 10° C./min. The Melt Flow Index (MFI) was measured at 230° C. and 21.6 N according to standard ASTM D 1238/L. The tension set was measured according to standard ASTM D412. The values of molecular weight distribution index were determined by GPC. The inversion number was calculated on the basis of $^{13}$C-NMR analysis according to known techniques.

TABLE 1

| Polymer material | Density (g/cm³) | MFI (dg/min) | Tension set at 20° C. (%) | $\Delta H_{2m}$ (J/g) | $M_w/M_n$ | Inversions (%) |
|---|---|---|---|---|---|---|
| PP 1 | 0.900 | 1.8 | — | 90 | — | — |
| PP 2 | 0.900 | 3.0 | — | 95 | — | — |
| EPDM 1 | 0.870 | — | 20 | 15 | 2 | <1 |
| EPDM 2 | 0.880 | — | 40 | 29.4 | 4.5 | 11 |
| PP/EPR mix | 0.880 | 0.9 | — | 35 | 9.7 | <1 |

PP 1 (Moplen ® EP 2S30B - Montell): crystalline propylene/ethylene copolymer;
PP 2 (Moplen ® T 30S - Montell): isotactic polypropylene (homopolymer);

TABLE 1-continued

| Polymer material | Density (g/cm³) | MFI (dg/min) | Tension set at 20° C. (%) | $\Delta H_{2m}$ (J/g) | $M_w/M_n$ | Inversions (%) |
|---|---|---|---|---|---|---|

EPDM 1: elastomeric ethylene/propylene/5-ethylidene-2-norbornene terpolymer with a weight ratio 70/27/3, obtained by metallocene catalysis as described in EP-A-632,065 (intrinsic viscosity = 5.1, measured in tetralin at 135° C.; Mooney viscosity ML (1 + 4) = 25, measured at 125° C. according to ASTM D1646);
EPDM 2 (Nordel ® 2722 - Dow-Du Pont): elastomeric ethylene/propylene/diene terpolymer with a weight ratio 72/24/4, obtained by vanadium Ziegler-Natta catalysis (Mooney viscosity ML (1 + 4) = 25, measured at 125° C. according to ASTM D1646);
PP/EPR mix (Hifax ® CA 12A - Montell): reactor mixture obtained by titanium Ziegler-Natta catalysis (Catalloy ® technique), consisting of: 40% by weight of crystalline polypropylene (homopolymer) and 60% by weight of ethylene/propylene rubber in a 60/40 weight ratio; the elastomeric component was characterized as reported in Table 1 after extraction with n-hexane.

PP 1 (Moplen® EP 2S30B—Montell): crystalline propylene/ethylene copolymer;

PP 2 (Moplen® T 30S—Montell): isotactic polypropylene (homopolymer);

EPDM 1: elastomeric ethylene/propylene/5-ethylidene-2-norbornene terpolymer with a weight ratio 70/27/3, obtained by metallocene catalysis as described in EP-A-632,065 (intrinsic viscosity=5.1, measured in tetralin at 135° C.; Mooney viscosity ML(1+4)=25, measured at 125° C. according to ASTM D1646);

EPDM 2 (Nordel® 2722—Dow-Du Pont): elastomeric ethylene/propylene/diene terpolymer with a weight ratio 72/24/4, obtained by vanadium Ziegler-Natta catalysis (Mooney viscosity ML(1+4)=25, measured at 125° C. according to ASTM D1646);

PP/EPR mix (Hifax® CA 12A—Montell): reactor mixture obtained by titanium Ziegler-Natta catalysis (Catalloy® technique), consisting of: 40% by weight of crystalline polypropylene (homopolymer) and 60% by weight of ethylene/propylene rubber in a 60/40 weight ratio; the elastomeric component was characterized as reported in Table 1 after extraction with n-hexane.

The polymer materials in Table 1 were used to make the mixtures reported in Table 2.

Mixtures 1, 1a, 3 and 3a were prepared in a Brabender mixer (volume of the mixing chamber: 80 cm³), filled to 95% of volume. Mixing was carried out at a temperature of 170° C. for a total time of 10 min (rotor speed: 40 rpm). At the end of the mixing, the final torque (reported in Table 2) was measured under the above-mentioned conditions.

Mixtures 2, 4 and 5 were prepared in a 20 mm-diameter counter-rotatory Brabender twin-screw mixer with a rotor speed of 50 rpm and with the following temperature profile: 1st zone=100° C., 2nd zone=160° C., 3rd zone=190° C., 4th zone=190° C.

For the filled systems there were used:

Hydrofy® GS-1.5: Mg(OH)$_2$ coated with stearic acid from SIMA (average particle diameter: 2 μm; specific surface: 11 m²/g);

Rhodorsil® MF175U: silicone rubber from Rhône-Poulenc acting as processing co-adjuvant/lubricant.

The following were used as antioxidants:

Irganox® 1010: pentaerythrhyl-tetra[3-(3,5-di-tert-butyl-4-hydroxyphenyl)propionate] (Ciba-Geigy);

Irganox® PS802 FL: distearyl thiodipropionate (DSTDP) (Ciba-Geigy).

The compositions are given in Table 2 as phr (i.e. parts by weight per 100 parts of polymer matrix).

The mixtures thus obtained were subjected to mechanical tensile strength tests according to CEI standard 20–34 § 5.1, on test specimens obtained from 1 mm-thick plates produced by compression moulding at 190–195° C. and 200 bar after preheating for 5 min at the same temperature. The pulling speed of the clamps was 250 mm/min for mixtures 1, 1a, 3 and 3a, and 50 mm/min for mixtures 2, 4 and 5. The results are given in Table 2.

The measurements for water absorption at 70° C. were carried out on specimens measuring 80×4×1 mm, after they had first been conditioned for 24 hours at 90° C. in a vacuum oven. The tests were carried out in an air oven at 70° C. by immersing the test pieces in water with a minimum level of 15 cm. The water content was measured using a Karl-Fisher titration apparatus.

TABLE 2

| EXAMPLE | 1 | 1a | 2 | 3(*) | 3a(*) | 4(*) | 5(*) |
|---|---|---|---|---|---|---|---|
| PP 1 | 35 | 35 | — | 35 | 35 | — | — |
| PP 2 | — | — | 40 | — | — | 40 | — |
| EPDM 1 | 65 | 65 | 60 | — | — | — | — |
| EPDM 2 | — | — | — | 65 | 65 | 60 | — |
| PP/EPR mix | — | — | — | — | — | — | 100 |
| Hydrofy ® GS-1.5 | — | 160 | — | — | 160 | — | — |
| Rhodorsil ® MF175U | — | 1.5 | — | — | 1.5 | — | — |
| Irganox ® PS802FL | — | — | 0.2 | — | — | 0.2 | — |
| Irganox ® 1010 | — | 0.5 | 0.1 | — | 0.5 | 0.1 | — |
| Final torque (N.m) | 10.0 | 10.8 | — | 9.0 | 14.1 | — | — |
| Stress at break (MPa) | 14.7 | 5.1 | 18.7 | 12.6 | 3.7 | 14.3 | 7.3 |
| Elongation at break (%) | 806 | 471 | 801 | 731 | 112 | 576 | 104 |
| Modulus at 2.5% (MPa) | — | — | 4.8 | — | — | 5.3 | 5.2 |
| Modulus at 10% (MPa) | — | — | 7.9 | — | — | 8.2 | 7.3 |
| Modulus at 20% (MPa) | 5.2 | 4.5 | — | 7.2 | 4.4 | — | — |
| Water absorption at 70° C. (ppm) | — | — | | — | — | | |
| initial | | | 18 | | | 10 | 40 |
| after 1 day | | | 890 | | | 1436 | 2400 |
| after 7 days | | | 2161 | | | 3327 | 3109 |

(*)comparative

What is claimed is:

1. A cable comprising a conductor and at least one coating layer, wherein said at least one coating layer comprises, as non-crosslinked base polymer material, a mixture comprising: a crystalline propylene homopolymer or copolymer; and an elastomeric copolymer of ethylene with at least one alpha-olefin having from 3 to 12 carbon atoms, and optionally with a diene; said elastomeric copolymer being characterized by a 200% tension set value lower than 30%, measured at 20° C. for 1 minute according to ASTM standard D 412.

2. The cable according to claim 1, wherein the elastomeric copolymer is characterized by a 200% tension set value lower than 25%.

3. The cable according to claim 1, wherein said at least one coating layer has electrical insulating properties and comprises a mixture of said crystalline propylene homopolymer or copolymer and said elastomeric copolymer as non-crosslinked base polymer material.

4. The cable according to claim 1, wherein said at least one coating layer has semiconductive properties and comprises a mixture of said crystalline propylene homopolymer or copolymer and said elastomeric copolymer as non-crosslinked base polymer material.

5. The cable according to claim 1, wherein said at least one coating layer is an outer protective sheath and comprises a mixture of said crystalline propylene homopolymer or copolymer and said elastomeric copolymer as non-crosslinked base polymer material.

6. The cable according to claim 1, wherein at least 70% by weight, with respect to the total weight of the base polymer material of said at least one coating layer, consists of a mixture of said crystalline propylene homopolymer or copolymer and said elastomeric copolymer.

7. The cable according to claim 6, wherein at least 90% by weight, with respect to the total weight of the base polymer material of said at least one coating layer, consists of a mixture of said crystalline propylene homopolymer or copolymer and said elastomeric copolymer.

8. The cable according to claim 1, wherein the elastomeric copolymer has a melting enthalpy of less than 35 J/g.

9. The cable according to claim 1, wherein the elastomeric copolymer has an intrinsic viscosity, determined in tetralin at 135° C., of greater than 1.0 dl/g.

10. The cable according to claim 9, wherein the elastomeric copolymer has an intrinsic viscosity, determined in tetralin at 135° C., of greater than 2.0 dl/g.

11. The cable according to claim 1, wherein the elastomeric copolymer has a Mooney viscosity ML(1+4) at 125° C., measured according to standard ASTM D1646, of at least 10.

12. The cable according to claim 11, wherein the elastomeric copolymer has a Mooney viscosity ML(1+4) at 125° C. of from 20 to 90.

13. The cable according to claim 1, wherein the elastomeric copolymer has a molecular weight distribution index of less than 5.

14. The cable according to claim 13, wherein the elastomeric copolymer has a molecular weight distribution index of less than 3.

15. The cable according to claim 1, wherein the elastomeric copolymer is obtainable by copolymerization of ethylene with an alpha-olefin, and optionally with a diene, in the presence of a single-site catalyst.

16. The cable according to claim 15, wherein the single-site catalyst is a metallocene catalyst.

17. The cable according to claim 15, wherein the single-site catalyst is a Constrained Geometry Catalyst.

18. The cable according to claim 1, wherein the elastomeric copolymer has the following composition: 35–90 mol % of ethylene; 10–65 mol % of alpha-olefin; and 0–10 mol % of a diene.

19. The cable according to claim 1, wherein the alpha-olefin in the elastomeric copolymer is propylene.

20. The cable according to claim 19, wherein the elastomeric copolymer has the following composition: 55–80% by weight of ethylene; 20–45% by weight of propylene, and 0–10% by weight of a diene.

21. The cable according to claim 20, wherein the elastomeric copolymer has the following composition: 65–75% by weight of ethylene; 25–35% by weight of propylene,; and 0–5% by weight of a diene.

22. The cable according to claim 1, wherein the crystalline propylene homopolymer or copolymer has a melting enthalpy of greater than 75 J/g.

23. The cable according to claim 22, wherein the crystalline propylene homopolymer or copolymer has a melting enthalpy of greater than 85 J/g.

24. The cable according to claim 1, wherein the elastomeric copolymer is present in admixture with the crystalline propylene homopolymer or copolymer in a predetermined amount, such as to confer sufficient flexibility to the resulting polymer mixture.

25. The cable according to claim 24, wherein the elastomeric copolymer is present in admixture with the crystalline propylene homopolymer or copolymer in an amount such that the resulting polymer mixture has a value of elongation at break, measured according to CEI standard 20–34, §5.1, of at least 100%, and a value of 20% modulus, measured according to CEI standard 20–34, §5.1, of less than 10 Mpa.

26. The cable according to claim 25, wherein the elastomeric copolymer is present in admixture with the crystalline propylene homopolymer or copolymer in an amount such that the resulting polymer mixture has a value of elongation at break, measured according to CEI standard 20–34, §5.1, of at least 200%, and a value of 20% modulus, measured according to CEI standard 20–34, §5.1, of less than 7 Mpa.

27. The cable according to claim 1, wherein the mixture comprises from 10 to 60% by weight of crystalline propylene homopolymer or copolymer, and from 40 to 90% by weight of elastomeric copolymer, the percentages being relative to the total weight of the crystalline propylene homopolymer or copolymer and the elastomeric copolymer.

28. The cable according to claim 27, wherein the mixture comprises from 20 to 40% by weight of crystalline propylene homopolymer or copolymer, and from 60 to 80% by weight of elastomeric copolymer, the percentages being relative to the total weight of the crystalline propylene homopolymer or copolymer and the elastomeric copolymer.

* * * * *